United States Patent Office 3,396,200
Patented Aug. 6, 1968

3,396,200
PREPARATION OF 2,4,6-TRICHLORO-
NITROBENZENE
Raymond S. George and Robert K. Rohwer, Los Alamos, N. Mex., assignors to the United States of America as represented by the United States Atomic Energy Commission
No Drawing. Filed June 2, 1967, Ser. No. 644,442
3 Claims. (Cl. 260—646)

ABSTRACT OF THE DISCLOSURE

A method of preparing 2,4,6-trichloronitrobenzene in which a solution of aniline in glacial acetic acid is reacted with gaseous hydrogen chloride, chlorinated in the presence of a catalyst, heated after adding sulfuric acid to remove the resulting product gas, oxidized in two steps by adding hydrogen peroxide and then nitric acid with heating, and filtering the precipitate.

The invention described herein was made in the course of, or under, a contract with the U.S. Atomic Energy Commission.

The inventors have discovered a process for preparing 2,4,6-trichloronitrobenzene that is unique and novel in that it is not necessary to isolate any of the intermediate products. Specifically, the process is different from the prior art in that hydrogen peroxide and nitric acid are added to the aromatic amine and the intermediate oxidation products to produce the desired nitrobenzene compound. The product of this invention, 2,4,6-trichloronitrobenzene, is a well known and useful starting material for the preparation of a high explosive, i.e., 2,4,6-triamino-1,3,5-trinitrobenzene.

It is therefore an object of this invention to provide a method for preparing 2,4,6-trichloronitrobenzene and specifically a method in which the intermediate products need not be isolated.

It is a further object of this invention to provide an economical method of preparing 2,4,6-trichloronitrobenzene in reasonable yields and of sufficient purity that the isolated productc an be used without further treatment for the preparation of 2,4,6-triamino-1,3,5-trinitrobenzene.

Other objects of this invention will be apparent from the following description of the preferred embodiment of the invention.

The preparation of 2,4,6-trichloronitrobenzene is a one-pot process using aniline as the starting material. A 17.5 volume percent solution of aniline in glacial acetic acid is treated with gaseous hydrogen chloride to prepare aniline hydrochloride. The aniline hydrochloride is chlorinated with chlorine gas at 20° C. in the presence of a catalyst (e.g., aluminum chloride or ferric chloride) to form 2,4,6-trichloroaniline hydrochloride. The solution is treated with 13 volume percent sulfuric acid (98 weight percent $H_2SO_4$ in $H_2O$) to dehydrochlorinate the 2,4,6-trichloroaniline hydrochloride, and heated under reduced pressure to remove dissolved chlorine and hydrogen chloride. To this solution of 2,4,6-trichloroaniline is added 55 volume percent hydrogen peroxide (30 weight percent $H_2O_2$ in $H_2O$). The solution is allowed to react at 20° C. until no further precipitation of 2,4,6-trichloronitrosobenzene is observed. At this point 18 volume percent nitric acid (71 weight percent $HNO_3$ in $H_2O$) is added and the solution is heated for several hours at 85–90° C. The solution is cooled slowly with rapid stirring and the precipitated 2,4,6-trichloronitrobenzene is filtered.

Although the above description sets forth the optimum parameters for the described process, these parameters may be varied without departing from the scope of this invention and it is intended that all matter contained in the above disclosure shall be interpreted as illustrative and not in a limiting manner.

What is claimed is:
1. A method of preparing 2,4,6-trichloronitrobenzene comprising treating a solution of aniline in glacial acetic acid with gaseous hydrogen chloride, chlorinating in the presence of a catalyst, dehydrochlorinating with sulfuric acid, removing dissolved gases by heating, oxidizing with hydrogen peroxide and nitric acid and filtering the resulting precipitate.

2. The method of claim 1 in which the concentration of the said aniline in the glacial acetic acid is 17.5 volume percent, the concentration of the said hydrogen peroxide is 55 volume percent, and the concentration of the said nitric acid is 18 volume percent.

3. The method of claim 1 in which the said catalyst is selected from the class consisting of aluminum chloride and ferric chloride.

References Cited

UNITED STATES PATENTS 2,675,409   4/1954   Orloff et al. _____ 260—579

OTHER REFERENCES

Urbanski, Chemistry and Technology of Explosives, vol. I, The MacMillan Company, New York, 1964, p. 450.

LELAND A. SEBASTIAN, *Primary Examiner.*